T. F. JOHNSON, Jr.

METHOD OF TESTING AND LOCATING DEFECTIVE MULTIPLE PART PIN TYPE INSULATORS.

APPLICATION FILED AUG. 26, 1920.

Reissued Jan. 11, 1921. 15,025.

WITNESSES

Charles H. Durand

A. T. Chapman

INVENTOR

Tomlinson F. Johnson, Jr.,

BY E. G. Siggers

ATTORNEY

BEST AVAILABLE COPY

UNITED STATES PATENT OFFICE.

TOMLINSON FORT JOHNSON, JR., OF ATLANTA, GEORGIA.

METHOD OF TESTING AND LOCATING DEFECTIVE MULTIPLE-PART PIN-TYPE INSULATORS.

15,025. Specification of Reissued Letters Patent. Reissued Jan. 11, 1921.

Original No. 1,302,206, dated May 6, 1919, Serial No. 260,557, filed October 31, 1913. Application for reissue filed August 26, 1920. Serial No. 406,231.

*To all whom it may concern:*

Be it known that I, TOMLINSON F. JOHNSON, Jr., a citizen of the United States, residing at Atlanta, in the county of Fulton and State of Georgia, have invented a new and useful Method of Testing and Locating Defective Multiple-Part Pin-Type Insulators, of which the following is a specification.

This invention has reference to the method of testing multiple-part pin-type insulators to detect defects and locate such defects if present, and the object is to provide a method whereby the condition of the insulators may be readily ascertained and defects, if present, located without interruption of service.

The invention is an improvement upon the method of locating faulty suspension insulators on live wire transmission lines for which an application for Letters Patent was filed by me on March 16, 1918, under Serial No. 222,947. The method disclosed in said application has to do with the testing of suspension-type insulators each of which is made up of a plurality of separate units connected together in the form of a string, with each unit insulated from the neighboring units. The suspension-type of insulator has the units made up of porcelain and metal parts connected together in series, with the metal parts readily accessible, and in order to test out a string of suspension insulators two procedures are necessary, namely, feeling out, to ascertain whether the defects in a suspension insulator are of such nature as to permit the second step of localizing the defective units, or whether the defects are so marked as to prohibit such second procedure. For either or both of these purposes only a single instrument capable of operation by one man is needed.

In an installation employing pin-type insulators, the insulators are made up of several parts constituting a unit. A pin-type insulator comprises two or more nested parts between which layers of cement are lodged.

It has been found impossible to practise the same method applied to suspension insulators for testing pin-type insulators, wherefore it became necessary to devise the method of this specification, which differs from that of the aforesaid application in that arcs are drawn by means of a single-point good conducting implement, known as a feeling stick, from the line conductor and from the cement between the parts of the pin-type insulator in chosen order, and then, if conditions permit, short-circuiting the line conductor or the insulator supporting pin and a feeling stick engaging a cement layer, or two feeling sticks engaging neighboring cement layers, by means of a good conducting bridging implement known as a shorting stick, the short-circuiting also being performed in chosen order.

In the method applied to the suspension-type insulators two steps are employed and these steps necessitate the use of but one implement by one man. In the method employed with the pin-type insulators the two steps cannot be employed in the manner set forth in the application for reasons unnecessary to explain here. The step of preliminary or tentative testing, or feeling-out, as it is termed, occurs in both methods, except that in obtaining the basic sound, caused by the arc, directly from the insulators, it is obtained with pin-type insulators by testing through the cement. The second step, in the case of the pin-type insulator, is materially different from the second step with suspension insulators in that it becomes necessary to employ an implement known as a shorting stick in connection with the feeling stick, or two of the latter, so as to obtain the desired intensity of sound in drawing the arc. The method of testing the pin-type insulators on charged high tension transmission lines requires the conjoint use of two or three testing implements and an equal number of men to manipulate them.

The invention will be best understood from a consideration of the following detailed description taken in connection with the accompanying drawing forming part of this specification, with the understanding, however, that the invention is not confined to any strict conformity with the showing of the drawing but may be changed and modified so long as such changes and modifications mark no material departure from the salient features of the invention as expressed in the appended claims.

In the drawing:—

Figure 1 is a view showing a multiple-

BEST AVAILABLE COPY part pin-type insulator carrying a conductor forming part of a transmission line and indicating a preliminary step in the feeling-out procedure.

Figure 1:
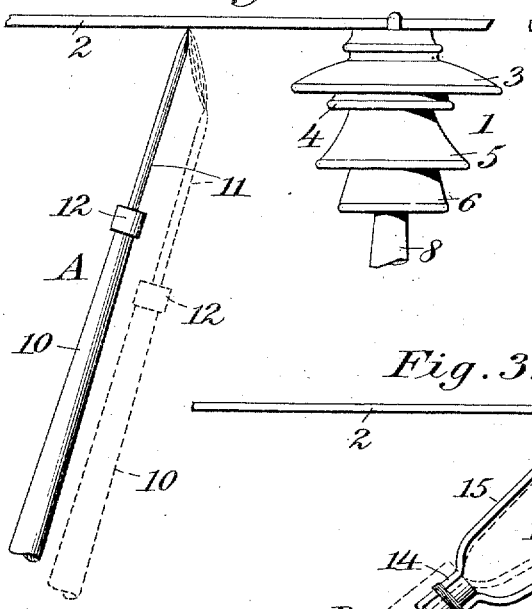
Figure 2:
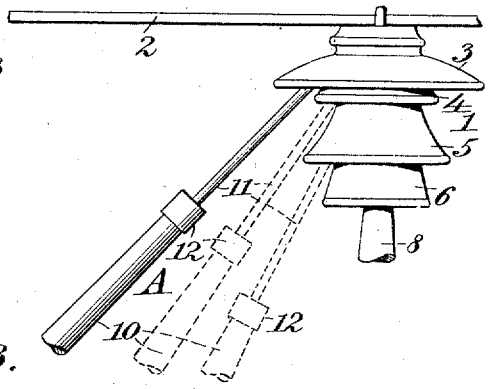
Fig. 2 is a view similar to Fig. 1 but indicating a subsequent step in the feeling-out procedure.
Figure 3:
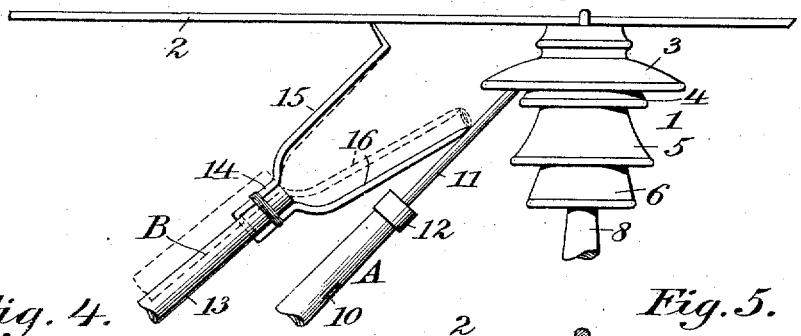
Fig. 3 is a similar view showing a preliminary step in the shorting test.
Figure 4:
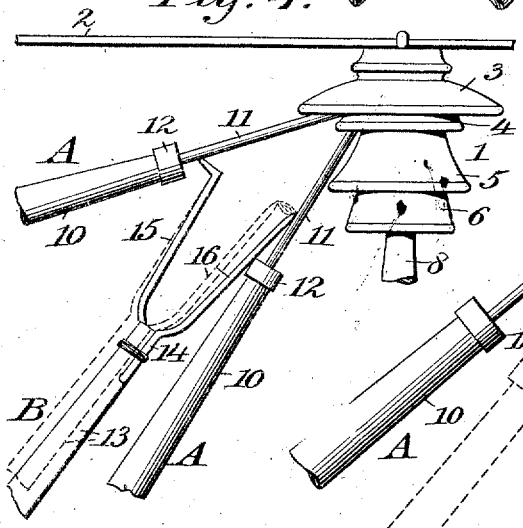
Fig. 4 is a view similar to Fig. 3 but showing a subsequent step in the shorting process.

Referring to the drawing, there is shown an insulator 1 of the pin-type and a conductor 2 carried by the insulator. The conductor 2 is assumed to be included in a high tension power transmission line with a voltage of many thousands. For convenience, the voltage may be considered as 60,000 although it is common in power transmission lines to have the current up to or above 100,000 volts. Such a current subjects insulation to very heavy strains and the insulators employed frequently break down, thereby not only being dangerous to life but wasteful of current on account of the charge of the line being grounded, and also stopping service.

Figure 5:
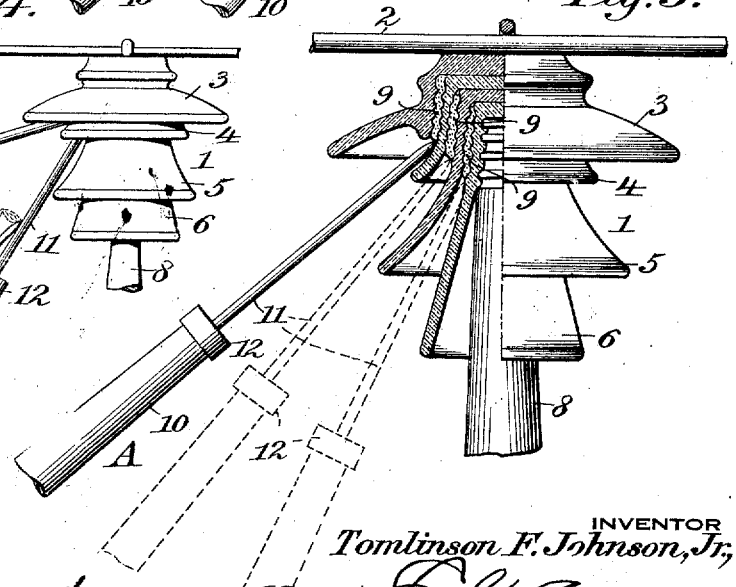
Fig. 5 is a view, partly in section and partly in elevation and on a larger scale than the preceding views, showing details of the insulator construction and certain steps in either the feeling-out or the shorting procedure with respect to the feeling-out stick.

The insulator is made up of several porcelain parts 3, 4, 5, 6, although a lesser or a greater number of parts may be employed, the arrangement, best shown in Fig. 5, being adapted for the support of the conductor 2 carrying a current of, say, 60,000 volts, and the several parts of the insulator are shown as of the skirted type. The skirt 6, being the part most remote from the conductor, is mounted on a pin 8 of either metal or wood and the pin is suitably supported on a pole or tower. The several parts of the insulator are connected together by cement 9.

In carrying out the method, certain tools are needed and comprise a feeling stick A and a shorting stick B. The feeling stick A has an elongated handle 10 of insulating qualities for the current being transmitted, such a handle being ordinarily about eight feet long and an inch and a quarter, more or less, in diameter. From one end of the handle there projects a pointed metal rod 11 which, for certain types of insulators, may be straight, but for other types must be more or less bent. In the drawing, only the straight form of pointed rod 11 is indicated. Where the rod emerges from the handle 10 a ferrule 12 may be applied.

The shorting stick B is similar to the feeling stick A in that it is provided with a handle 13, say, about eight feet long and an inch and a quarter in diameter, and at one end there is attached a metal fork 14 with two arms 15 and 16 respectively. Both of these arms are of metal and pointed at the free ends, the shape of these arms depending upon the particular form of insulator to be tested.

In carrying out the method with the instrumentalities described and under the assumption that the insulators are of the type shown, the first step is that of feeling-out the insulator which is done with the feeling stick A. If the feeling-out process demonstrates that it is safe to do so, the shorting process follows to determine the exact location of the fault. If an insulator is very defective then the feeling operation indicates that the shorting operation cannot be applied at all. The feeling operation is inaccurate so far as definitely locating a fault but it will indicate, if the insulator be very defective, that the shorting operation would be dangerous. Such shorting operation is very accurate in locating the defects but is prohibitively dangerous unless preceded by the feeling operation and its application governed in accordance with the indications of the feeling operation.

In order to carry out the feeling operation the point of the rod 11 of the stick A is touched to the line conductor 2, as shown in Fig. 1, and then drawn slowly away from the line conductor. This produces a distinct buzzing sound between the point and the conductor, which, in case of a 60,000 volt line, will be audible until the feeling point is an inch or more away from the line conductor. The operation is repeated by touching the cement 9 between the porcelain part 3 and 4. On the drawing the point of the rod 11 away from the cement the sound will not follow the feeling stick nearly so far as it would from the line conductor, if the porcelain 3 be perfect. If, however, the porcelain part 3 has become defective the sound drawn from the cement between the parts 3 and 4 will increase, approaching nearer and nearer to the sound drawn directly from the line conductor as the insulator part 3 has become more and more defective. It would seem, therefore, that when the insulator part 3 is totally defective the sound from the line and the sound from the cement between parts 3 and 4 will become equal. Such natural conclusion is but seldom verified by what actually happens in practice. The sounds approach near enough to equality, under almost any conditions, to raise the suspicion that part 3 is totally defective but it is only a very exceptional occurrence that the sounds become actually equal. The operation is then repeated by touching the feeling point to and drawing it away from the cement between the insulator parts 4 and 5. If

BEST AVAILABLE COPY part 4 is perfect the sound given off by the cement will be less than the sound given off by the cement between parts 3 and 4. The nearer to equality the sounds approach the more defective will part 4 be. When part 4 is totally defective the sound from the cement on each side of it will in all cases be equal.

The operation is repeated for each unit part of the insulator and the difference (the greater the difference the nearer perfect the porcelain part) in the sounds given off by the cement on each side of any part indicates the degree of defectiveness of the part between the cement sections. When the last part of the insulator, represented by the part 6 in the drawing, is reached, the feeling operation is made on the cement on one side and the pin 8 on the other side. Every part of a multiple-part pin-type insulator reads true to form during the feeling process, except the top part 3. That is, the sounds given off by the cement on each side of an insulator part will be equal when the part between the cement sections is totally defective or dead, except the top part is very often dead while the sound given off by the line conductor on one side and the cement on the other side of said part will not be equal.

When the feeling process gives indications that the insulator is very defective there is no need of using the shorting process. However, when the feeling process indicates that the insulator is entirely good the shorting process should be used because this process locates parts which are only slightly defective and also locates parts which are totally defective.

The shorting process is applied to an insulator only after the feeling process has been first applied and has clearly indicated that it would be entirely safe to use the shorting process.

Those parts of the insulator which give indication under the feeling process of being defective should be the first ones to be put to the shorting test. This is desirable, for if one of the good parts were subjected to the shorting test first the insulator might flash, whereas, by shorting the defective parts first the number of good parts remaining is definitely established as well as the degree of defectiveness of such defective parts.

In shorting an insulator of more than two parts, two feeling sticks A are required. If it be assumed that the shorting process is to be followed out in an orderly manner from the conductor to the insulator pin, then the feeling point of a feeling stick is placed firmly against the cement between the parts 3 and 4 of the insulator. One horn or arm of the fork of the shorting stick is placed against the line conductor and held there and then the feeling rod 11 is moved into and out of contact with the other arm or fork of the shorting stick. This produces a snappy spark. If the top part of the insulator be perfect the sound of the spark will be that of the normal good top part or skirt. If, however, the top part be defective the sound of the spark will be less than the normal spark of a perfect top skirt and as the top part or skirt becomes more and more defective the spark obtained will decrease in intensity, but will seldom or never reach zero.

Having ascertained the condition of the top part of the insulator, another feeling point is engaged with the cement between the parts 4 and 5 and the shorting stick is applied to the feeling stick engaging the cement between the insulator parts 3 and 4. Then the feeling stick engaging the cement between the parts 4 and 5 is brought into and out of contact with the other arm of the shorting stick, whereupon, if the part 4 be good a snappy spark will be produced, but the sound will be less than that of the spark produced across part 3 when the latter is good. With a defective part 4 the spark will be less and if the part 4 be wholly defective then no spark at all will be heard.

The same conditions hold good for all the remaining insulator parts. When the last part 6 is reached the shorting is done between a feeling point on the cement between the parts 5 and 6 and the pin supporting the insulator if such pin be of metal. If the pin be of wood a feeling point is forced as far as possible up inside the insulator member next to the wooden pin and the shorting is done between this feeling point and the feeling point against the cement between the insulator parts 5 and 6. In the case of wooden pins the bottom skirt acts very much like the top skirt.

The testing of the insulators may be conveniently done by a crew consisting of two persons, and as defective insulators are discovered they are marked conspicuously, as for instance, with a daub of red paint. The testing crews are followed by the maintenance crews who replace all marked insulators. Both the testing and replacing of the insulators are done while the lines are alive and in fact the testing requires that the lines be alive.

Such defects as cracks on the outer edges of the porcelain parts, or broken insulators, are not indicated by the method of this invention and in fact do not need to be since such defects are readily ascertainable on sight. If, however, the defects extend into the main body of the insulator, whether such defects be cracks, holes, porosity, or other similar defects, the method of this invention readily detects them. By repeating the tests at suitable intervals and removing

BEST AVAILABLE COPY defective insulators as discovered, all occurrence of punctured insulators on the system can be eliminated. Furthermore, the method is carried out without in any manner interfering with the active operation of the line, thus preventing stoppage of service both in the electrical transmission of power and of industries depending for their operation upon the furnishing of the electrical power.

What is claimed is:—

1. The method of testing and locating defective parts of multiple-part pin-type insulators on live transmission lines, which consists in drawing arcs, by means of an implement of good conducting material, from the line conductor and from the cement between the parts of the pin-type insulator, in chosen order, and then short-circuiting, by means of a bridging implement of good conducting material placed between the line conductor and a single conducting implement engaging the first cement layer in the insulator from the line conductor, and then between two single conducting implements connecting adjacent cement layers to short-circuit the intervening insulator units through the cement, in chosen order.

2. The method of testing and locating defective parts of multiple-part pin-type insulators on live transmission lines, which consists in drawing arcs, in chosen order, from the line conductor and from the cement between the parts of the pin-type insulator by means of a single feeling stick of a length to reach the cement, and then short-circuiting the line conductor and first cement layer next to the line conductor by means of a shorting or bridging stick, and short-circuiting the subsequent cement layers by the bridging stick and two of the first named feeling sticks between which the bridging stick is placed, and making and breaking the short-circuits to produce sparks.

3. The method of testing multiple-part pin-type insulators on live transmission lines for locating defective insulators or parts thereof, which consists of testing each part of the insulator, in chosen order, by means of a single implement of good conducting material to ascertain whether or not it is safe to definitely locate the defective parts of such insulator, and then establishing current paths of good conducting material from the cement layers between the several elements of the insulator and short-circuiting and breaking said paths about the elements of the insulator in chosen order, whereby to definitely locate faulty parts.

4. The method of testing multiple-part pin-type insulators on live transmission lines, which consists in first tentatively testing the several parts of the insulator by drawing arcs in succession from the line conductor and from the different cement layers joining the several parts of the insulator in order, and then establishing about each insulating unit of the insulator a path of good conducting material, in chosen order, with the path engaging the cement between the neighboring insulator units, and then breaking the path of good conducting material to produce a spark, whereby the preliminary arcs determine whether or not it is safe to establish paths of good conducting material about the insulator units and the character of the spark caused by breaking the conducting path determines the insulating quality of the part of the insulator being tested.

In testimony that I claim the foregoing as my own I have hereto affixed my signature.

TOMLINSON FORT JOHNSON, Jr.